3,280,191
METHOD FOR PREPARING DIHYDROXY-ACETONE

Charles E. Wheelock, Minneapolis, Minn., assignor to The Pillsbury Company, Minneapolis, Minn., a corporation of Delaware
No Drawing. Filed Mar. 13, 1963, Ser. No. 264,750
10 Claims. (Cl. 260—594)

This invention relates to a novel method for preparing dihydroxyacetone.

The compound dihydroxyacetone $$(HO.CH_2.CO.CH_2.OH)$$

is a reducing sugar, more specifically a ketotriose, which is closely related to a trihydric alcohol glycerine. It is also isomerically related to the aldotriose glyceraldehyde. Dihydroxyacetone and glyceraldehyde have a common enol form and are interconvertible therethrough. At the present time the primary use for dihydroxyacetone is in sun tanning lotions adapted to produce artificial tanning of the skin. It appears that when applied to the skin in fairly dilute solutions (e.g., 5%), the compound reacts with proteinaceous material of the skin to produce a change in color.

Heretofore, dihydroxyacetone has been prepared only by the action of certain micro-organisms on glycerine. The preparation has consequently been characterized by all the disadvantages which normally attend such biological processes.

It is, therefore, the general object of the present invention to provide a chemical synthesis for dihydroxyacetone.

In accordance with the present invention, this object is attained by mixing an aqueous solution of sodium hydroxide with a solution containing 1,3-dichloroacetone (1,3-dichloro-2-propanone), hereinafter for brevity referred to as dichloroacetone, while maintaining the reactants at temperatures below approximately 20° C. When conducted under proper conditions, the above reaction will yield a reaction mixture in which reducing sugars are present at a concentration of at least 90 percent by weight and from which dihydroxyacetone can be recovered in significant quantities.

It is imperative that the reaction temperature be maintained at all times below 20° C as noted above. More desirably, the temperature should be maintained below 10° C., and as will be apparent from the illustrative examples as set forth below, it is preferred that the temperature be maintained at approximately 0° C. At temperatures above 20° C. discoloration of the reaction mixture occurs and the yield of reducing sugars is markedly decreased.

It has been found that the reaction proceeds more efficiently if the dichloroacetone is slowly dripped into the solution containing sodium hydroxide. It is not known whether the improvement in the efficiency of the reaction which results from this technique is attributable merely to the lower temperatures which result from a slow addition or to other phenomena which are presently not fully understood. In any event, dropwise addition of dichloroacetone to sodium hydroxide is preferred.

With respect to concentration, although sodium hydroxide solutions at concentrations as great as 5 N may be used, it is preferred that the concentration be maintained below 1 N. Suitable concentrations of sodium hydroxide range from .1 N to 1 N. In this connection, dichloroacetone may be used in solution either in water or in any stable water-miscible organic solvent such as acetone, or, any of the lower alcohols.

Although the reaction will proceed at any proportion of sodium hydroxide to dihydroxyacetone, it is desirable that the molar ratio of sodium hydroxide to dihydroxyacetone be maintained at approximately 1.5.

In the production of dihydroxyacetone or useful solutions containing dihydroxyacetone, the crude reaction mixture resulting from the hydrolysis step described above is preferably acidified with hydrochloric acid or any other convenient acid to bring the pH within the range of 6 to 7. It is preferred that the pH be kept on the acid side since basic conditions favor conversion of dihydroxyacetone to glyceraldehyde through enolization.

Excess water is when removed by any convenient low temperature drying technique. Vacuum evaporation at temperatures below 0° C., subliming water vapor while maintaining the reaction mixture in a frozen state, or freeze concentration are examples of suitable drying techniques. Of these, sublimation is preferred.

The dehydrated residue which remains is then extracted with an organic solvent in which dihydroxyacetone is soluble. This extraction separates the organic reaction products from the inorganic values present in the reaction mixture. Examples of suitable solvents include lower aliphatic alcohols or acetone, of which acetone is preferred.

Upon removal of the last-mentioned organic extraction solvent by any convenient low temperature technique such as evaporation, an oil is obtained which contains dihydroxyacetone. This oil, being a solution of dihydroxyacetone in other organic materials among which glyceraldehyde may occur, is useful as an artificial skin tanning agent. For such use, dilution to a concentration of approximately five percent by weight is recommended.

The reactivity and sensitivity of the carbonyl group of dihydroxyacetone renders difficult its separation from the above-described oil. As will be illustrated below, chromatographic adsorption is one technique by which separation can be accomplished. The formation of derivatives in which the carbonyl group of dihydroxyacetone is protected during separation is another technique which may be used. For example, the carbonyl group of dihydroxyacetone can be protected by utilizing it to form a ketal. The ketal can then be separated from the oil by means of conventional separation techniques, such as, for example, distillation under basic conditions and sub-atmospheric pressures. The separated ketal may be hydrolyzed back to dihydroxyacetone by merely acidifying in the presence of water with any suitable mineral acid.

More specifically, the dihydroxyacetone-containing oil may be contacted with ethyl orthoformate from which a diethyl ketal results. The diethyl ketal may then be separated from the reaction mixture by vacuum distillation while maintained under basic conditions. Dihydroxyacetone may then be recovered upon hydrolysis of the separated ketal by acidifying with hydrochloric acid. Other similar separation techniques will be apparent to those skilled in the art.

To illustrate the invention in greater detail, the following illustrative examples are offered:

Example I

One equivalent amount of dischloroacetone was dissolved in water and placed into a dropping funnel. Two equivalents of sodium hydroxide at a concentration of 1 N were placed into a three-neck flask equipped with a stirrer and thermometer nad cooled to 0° C. in an ice bath. The dichloroacetone was dripped slowly into the chilled, agitated base. After the dichloroacetone had been completely added and the reaction complete (as determined by quantitative chloride), the pH was adjusted to 7.0 by adding a few drops of .1 N hydrochloric acid. A Somogyi reducing sugar determination was made on the aqueous solution which gave 92.8% reducing sugar when .1 N sodium hydroxide was used, 89.2% when 1 N base was used. By evaporation, the water was drawn off leaving a mixture of organic product and sodium chloride. To this mixture, anhydrous acetone was added; the organic portion went into solution and the sodium chloride settled out. The salt was filtered off and the dihydroxyacetone-acetone filtrate placed on a rotary evaporator. The acetone was evaporated off leaving a light brown, oily composition containing dihydroxyacetone. When placed upon the skin, the oil produced the characteristic tanning effect of dihydroxyacetone with no deleterious side effects.

*Example II*

The oil obtained by hydrolysis of dichloroacetone as described in Example I was separated by the following procedure using a 30 mm. by 400 mm. column and a Research Specialties Co. Model 1205 Automatic Fraction Collector:

A filter paper disk was placed on the fritted glass plate near the bottom of the column, and the column filled with Whatman's cellulose powder to within about 4 inches of the top. After each 1 inch to 1½ inch addition, the powder was tamped with a rod. A filter paper disk was placed at the top of the adsorbent.

A solution of 75% water saturated normal butanol and 25% benzene was poured on the column. When the column was completely wet, 2 ml. of an ethanol solution containing 300 mg. of the product from hydrolysis was added. Development of the column was initiated with the 75% water saturated normal butanol-25% benzene solvent; using 200 ml. in all and collecting 20 ml. fractions from the bottom of the column. In a similar fashion, 250 ml. of 95% water saturated normal butanol-5% benzene were added at the top of the column. Finally 300 ml. of water saturated normal butanol and then 200 ml. of water saturated normal butanol containing 1 ml. of conc. ammonium hydroxide were used. A total of forty-nine 20 ml. fractions were collected.

A 5 ml. portion of every third fraction was placed on a thin plate kieselguhr chromatogram and developed with 65 parts ethyl acetate and 35 parts 2:1 isopropanol:water solution. Fractions 8 through 18 all showed the presence of dihydroxyacetone. These were rechromatographed by the thin plate method. Dihydroxyacetone present in all had an $R_f$ value of .90. Fractions 8 through 11 also had a spot of $R_f$ value .95. Fractions 11 through 17 were combined and the solvent removed under vacuum on a Labline evaporator. The oil was taken up in acetone and cooled in a Dry Ice-acetone bath. The course, yellowish crystals were filtered and washed with cold acetone. The crystals melted at 66° C. They gave no mixed melting point with authentic, biologically produced dihydroxyacetone and separated at the same $R_f$ value when chromatographed with authentic dihydroxyacetone on a thin plate.

*Example III*

To illustrate that the hydrolysis of dichloroacetone may also be accomplished in an organic medium, 2.5 gm. of dichloroacetone were dissolved in 100 ml. of acetone and placed into a dropping funnel. 400 ml. of a 0.1 N solution of potassium hydroxide in ethanol were placed into a three-neck flask equipped with a stirrer and thermometer and then cooled to 0° C. in an ice bath. The dichloroacetone was dripped slowly from the funnel into the chilled, agitated base. After the dichloroacetone had been completely added and enough time allowed for the reaction to go to completion, the potassium chloride was filtered off and ion exchange resin (Amberlite IRC–50) was added. After the resin was filtered off, the alcoholic solution of dihydroxyacetone was placed under reduced pressure and the alcohol taken off. The dihydroxyacetone oil was similar in texture to the aqueous run, but was, however, more discolored.

*Example IV*

2.5 grams of dichloroacetone were dissolved in 100 ml. of acetone and placed into a dropping funnel. 400 ml. of .1 N sodium hydroxide were placed into a three-neck flask equipped with a stirrer and thermometer and cooled to 0° C.–5° C. in an ice bath. The dichloroacetone solution was dripped slowly into the chilled, agitated base. A quantitative chloride determination was made which indicated that the reaction had gone to completion in 2½ hours. The sodium and chloride ions were removed via ion exchange resin (Amberlite IR120 and IR400). A qualitative chloride determination was made after each pass through the resin and proved negative after four passes. The solution was frozen in an acetone bath and placed on a sublimation apparatus. This was made by connecting an empty flask to the frozen reaction flask by means of a transfer tube. The empty flask was placed into a Dry Ice-acetone bath; the frozen reaction product placed in an ice bath and by means of a vacuum pump the system was evacuated to .4 mm. Hg. Good transfer was observed. However, because of the amount of water present the procedure is very lengthy. After all of the water had been sublimed, about 10–15 ml. of a viscous, colorless product remained. This was transferred to a small flask and placed in a desiccator. After a short time, white crystals of dihydroxyacetone were observed.

*Example V*

2.5 gm. of dichloroacetone were dissolved in 60 ml. of water and placed into a dropping funnel. 40 ml. of 1 N sodium hydroxide was placed into a three-neck flask equipped with a stirrer and a thermometer and cooled to 0° C. in an ice bath. The dichloroacetone solution was dripped slowly into the chilled, agitated base. Total addition time was 2 hours. After this time a quantitative chloride determination showed that 92% of the chloride had been liberated. The pH was adjusted to 7.0 by adding a few drops of .1 N hydrochloric acid and a Somogyi reducing sugar determination made which showed 84.75% reducing sugar present. To the aqueous solution, 350 cc. of acetone was added and agitated vigorously for ½ hour. The solution was then placed into a Dry Ice-acetone bath freezing the water. The acetone portion was filtered off and a reducing sugar analysis made on it. 52.4% of the reducing sugar noted above was found in the acetone portion. Another acetone extraction was made on the aqueous portion and a reducing sugar analysis made on each portion. The dihydroxyacetone was distributed 50% in the acetone phase and the balance in the water phase. The two acetone phases were evaporated and gave a light brown, dihydroxyacetone syrup.

*Example VI*

One equivalent amount of dichloroacetone was dissolved in water and placed into a dropping funnel. Two equivalents of 1 N sodium hydroxide were placed into a three-neck flask equipped with a stirrer and thermometer and cooled to 0° C. in an ice bath. The dichloroacetone is dripped slowly into the chilled, agitated base. After the dichloroacetone has been completely added and the reaction complete (as determined by quantitative chloride), the pH is adjusted to 7.0 by adding a few drops of .1 N hydrochloric acid. A Somogyi reducing sugar determination is made on the aqueous solution which gave 92.8% reducing sugar when .1 N sodium hydroxide was used and 89.2% when 1 N base was used. By evaporation, the water is drawn off leaving a mixture of organic product and sodium chloride. To half of this mixture, 100 ml. of anhydrous methanol is added while 100 ml. of ethanol is added to the remainder. In both cases the organic portion of the mixture goes into solution and the sodium chloride settles out. The sodium chloride is filtered off and each filtrate is placed on a rotary evaporator. In both cases the dihydroxyacetone residue is left as a light brown syrup.

Example VII

One equivalent amount of dichloroacetone is dissolved in water and placed into a dropping funnel. Two equivalents of 1 N sodium hydroxide were placed into a three-neck flask equipped with a stirrer and thermometer and cooled to 0° C. in an ice bath. The dichloroacetone was dripped into the chilled, agitated base. After the dichloroacetone has been completely added and the reaction complete (as determined by quantitative chloride analyses), the pH was adjusted to 7.0 by adding a few drops of .1 N hydrochloric acid. A Somogyi reducing sugar determination was made on the aqueous solution which gave 92.8% reducing sugar when .1 N sodium hydroxide was used and 89.2% when 1 N base was used. By evaporation, the water was drawn off leaving a mixture of organic product and sodium chloride. To this mixture, anhydrous acetone was added. The organic portion went into solution while the sodium chloride settled out and was filtered off. The dihydroxyacetone-acetone solution was connected to a water cooled condenser and a high vacuum pulled. This rapid flash-over of the acetone which ensued is advantageous because the solvent is pulled off at a rapid rate and the opportunity for the dihydroxyacetone to react while in solution is minimized. The dihydroxyacetone-containing residue which remained had the appearance of a light brown oil.

It should be apparent that the above examples are merely illustrative of the invention and should not be interpreted in a limiting sense. Rather, the invention should be limited only by the appended claims.

I claim:

1. In a method for preparing dihydroxyacetone, the step of reacting 1,3 dichloroacetone with sodium hydroxide at a temperature ranging from about 0° C. to less than 20° C.

2. The method of claim 1 wherein the reaction is conducted at temperatures of less than 10° C.

3. In a method for preparing dihydroxyacetone, the step of slowly adding a solution containing 1,3 dichloroacetone to an aqueous solution of sodium hydroxide at a temperature ranging from about 0° C. to less than 20° C.

4. The method of claim 3 wherein the reaction is conducted at temperatures below 10° C.

5. The method of claim 3 wherein said sodium hydroxide is in an aqueous solution at a concentration of less than 5 N.

6. In a method for preparing dihydroxyacetone, the steps of:
    (a) slowly adding a solution of 1,3 dichloroacetone to an aqueous solution of sodium hydroxide at a temperature ranging from about 0° C. to less than 20° C.;
    (b) dehydrating the resultant reaction mixture at temperatures below approximately 0° C.;
    (c) contacting the dehydrated residue with an organic solvent selected from the group consisting of lower alcohols and acetone to produce an organic phase containing dihydroxyacetone; and,
    (d) removing said organic solvent from the resulting organic phase thereby producing an oil.

7. The method of claim 6 wherein dehydration of the reaction mixture is effected by sublimation.

8. The method of claim 7 wherein the reaction of step (a) is conducted at temperatures below 10° C.

9. The method of claim 8 wherein said solution of 1,3 dichloroacetone in step (b) is added dropwise to said solution of sodium hydroxide.

10. In a method for preparing dihydroxyacetone, the steps of:
    (a) slowly adding a solution of 1,3 dichloroacetone to an aqueous solution of sodium hydroxide at a temperature ranging from about 0° C. to less than 20° C.;
    (b) dehydrating the resultant reaction mixture at temperatures below approximately 0° C.;
    (c) contacting the dehydrated residue with an organic solvent selected from the group consisting of lower alcohols and acetone to produce an organic phase containing dihydroxyacetone;
    (d) removing said organic solvent from the resulting organic phase thereby producing an oil; and
    (e) separating dihydroxyacetone from said oil by selective adsorption.

References Cited by the Examiner

UNITED STATES PATENTS

| 1,566,818 | 12/1925 | Carter et al. | 260—640 |
| 1,984,725 | 12/1934 | Britton et al. | 260—640 |
| 2,107,197 | 2/1938 | Butignot | 260—594 |

LEON ZITVER, *Primary Examiner.*

DANIEL D. HORWITZ, *Examiner.*